INVENTORS
DONALD JACK CLEOBURY
GEORGE MITCHELL SMITH
BY Kurtz, Kurtz & [illegible]
ATTORNEYS INVENTORS
DONALD JACK CLEOBURY
GEORGE MITCHELL SMITH
BY Kinzler, Kinzler & Ottinger
ATTORNEYS INVENTORS
DONALD JACK CLEOBURY
GEORGE MITCHELL SMITH
BY Kirschstein, Kirschstein & Ottinger
ATTORNEYS March 21, 1967 D. J. CLEOBURY ET AL 3,310,743

DECODERS FOR PULSE CODE MODULATION SYSTEMS

Filed Jan. 15, 1964 5 Sheets-Sheet 4

INVENTORS
DONALD JACK CLEOBURY
GEORGE MITCHELL SMITH
BY Kimbleton, Kimbleton & [illegible]
ATTORNEYS INVENTORS
Donald Jack Cleobury
George Mitchell Smith
BY [signature]
ATTORNEYS 3,310,743

DECODERS FOR PULSE CODE MODULATION SYSTEMS

Donald Jack Cleobury, Overseal, near Burton-on-Trent, and George Mitchell Smith, Coventry, England, assignors to General Electric Company Limited, London, England Filed Jan. 15, 1964, Ser. No. 337,847
Claims priority, application Great Britain, Jan. 15, 1963, 1,785/63
11 Claims. (Cl. 325—321)

This invention relates to decoders for pulse code modulation systems.

In a previously proposed pulse code modulation system, information in respect of twelve audio frequency signals is transmitted making use of time division multiplex.

At the transmitter, the amplitude of each of the audio frequency signals is sampled at frequent, regularly recurrent instants, and each of the resulting sample voltages is coded by a coder, using a binary code, to form a code group comprising seven digits, each of which may be "0" or "1." Digits "0" and "1" are represented by the absence and presence, respectively, of a pulse in the appropriate pulse position of the code group.

The digits of the code group are "weighted" so that a code group is capable of representing in code form any one of 128 different levels of sample voltage. Thus the first digit of the code group represents 64 units of amplitude, the second digit of the code group represents 32 units of amplitude, the third digit of the code group represents 16 units of amplitude, and so on, until the seventh digit of the code group represents one unit of amplitude.

An eighth digit is then added at the beginning of each group for the purpose of providing synchronising information, the complete group of eight digits forming a channel group. Twelve channel groups, one in respect of each of the twelve channels in rotation, are then combined in sequence to form a frame, and successive frames are combined in sequence to form the signal which is transmitted.

At the receiver, the incoming pulse signal is regenerated and supplied to the decoder. Briefly, the decoder operates to form from each code group an amplitude modulated pulse corresponding to the sample voltage of the audio frequency signal represented by the incoming code group. A difficulty arises in that, until all the digits of an incoming code group have been received and supplied to the decoder, the decoder is not able to operate to form the desired amplitude modulated pulse. If, for example, the digits of the incoming code group are supplied to storage devices as they are received, the complete code group is only available in stored form for the interval between the receipt of the last digit of a code group and just prior to the receipt of the first digit of the next code group, when the storage arrangement will have to be reset.

One object of the present invention is to provide a decoder in which this difficulty is avoided.

Furthermore, in previously proposed systems, each storage stage has commonly been a two-condition bistable trigger circuit, and it is a further object of the present invention to provide a decoder in which some at least of the storage stages need not be two-condition bistable trigger circuits.

According to the present invention, a decoder for a receiver of a pulse code modulation system of the kind in which successive amplitude samples of a signal to be transmitted over the system are represented in pulse form by groups of $a$ plus $b$ digits ($a$ and $b$ being integral numbers), includes a first group of $a$ storage stages and a second group of $a$ plus $b$ storage stages, each storage stage being capable of storing one digit, the first $a$ digits of each incoming group of digits being stored in the $a$ stages respectively of the first group of storage stages and then being passed to $a$ stages respectively of the second group of storage stages, whereupon the first group of storage stages is reset ready to receive the first $a$ digits of the next incoming group of digits, and the last $b$ digits of each incoming group of digits being stored directly in the remaining $b$ stages respectively of the second group of storage stages, the arrangement being such that the $a$ plus $b$ digits of each incoming group of digits are stored simultaneously in the second group of storage stages for an interval exceeding one digit period of the incoming groups of digits, and at the end of said interval the second group of storage stages is reset.

Preferably said interval extends from the last of the $b$ digits of an incoming group of digits until just prior to the last of the first $a$ digits in the next incoming group of digits.

A decoder for a pulse code modulation system, the decoder being in accordance with the present invention, will now be described by way of example, with reference to the accompanying drawings in which.

Figure 1:
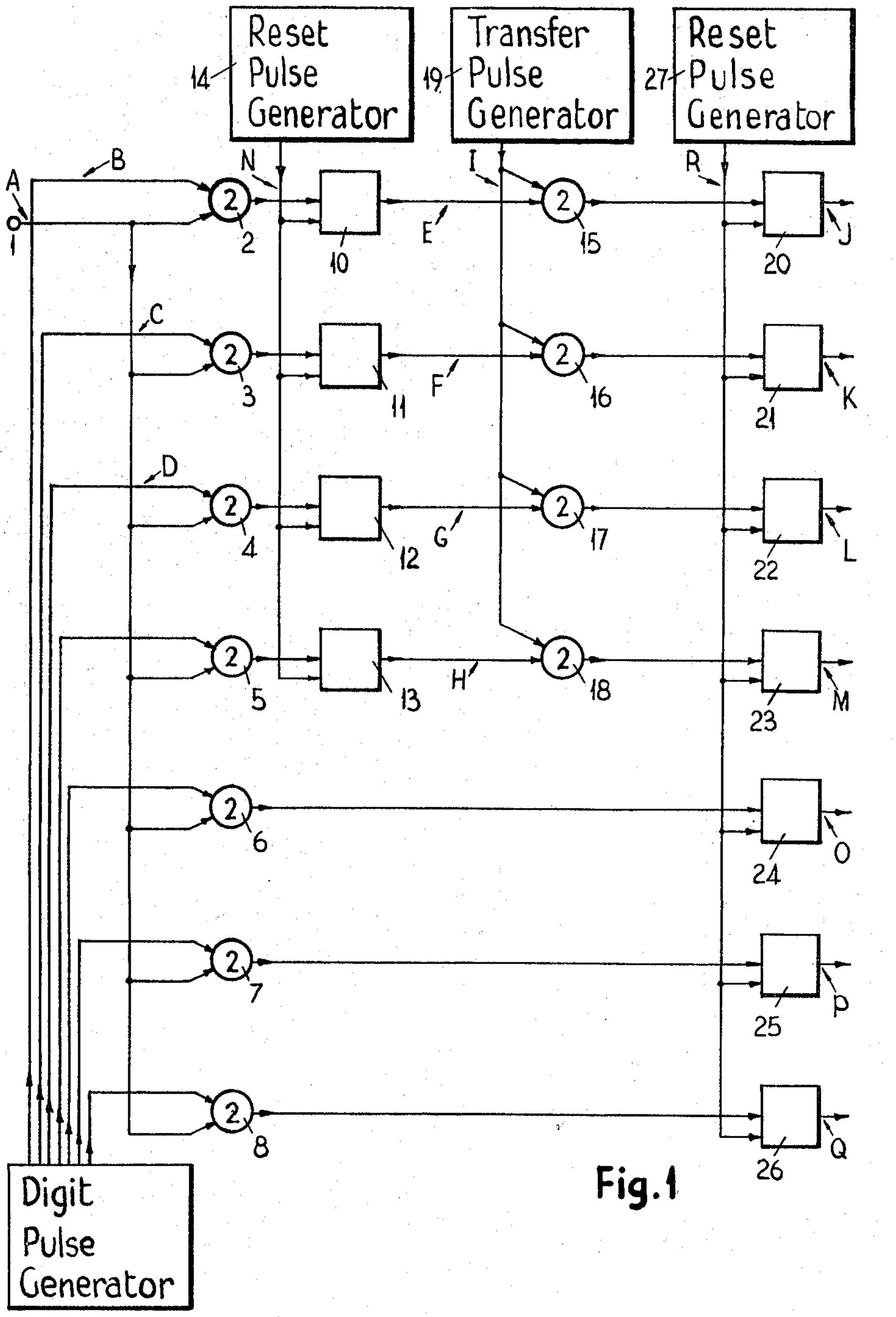
FIGURE 1 shows a part of the decoder in block schematic form.

The pulse code modulation system is a twelve channel telephone system, over which information in respect of twelve audio frequency signals is to be transmitted making use of time division multiplex. The decoder forms part of the receiver.

At the transmitter, the amplitude of each of the audio frequency signals is sampled at frequent, regularly recurrent instants, and each of the resulting sample voltages is coded by a coder, using a binary code, to form a code group comprising seven digits, each of which may be "0" or "1." Digits "0" and "1" are represented by the absence and presence, respectively, of a pulse in the appropriate pulse position of the code group.

The digits of the code group are "weighted" so that a code group is capable of representing in code form any one of 128 different levels of sample voltage. Thus the first digit of the code group represents 64 units of amplitude, the second digit of the code group represents 32 units of amplitude, the third digit of the code group represents 16 units of amplitude, and so on, until the seventh digit of the code group represents one unit of amplitude.

An eighth digit is then added at the beginning of each code group for the purpose of providing synchronising information, the complete group of eight digits forming a channel group. Twelve channel groups, one in respect of each of the twelve channels in rotation, are then combined in sequence to form a frame, and successive frames are combined in sequence to form the signal which is transmitted.

At the receiver, the incoming pulse signal is regenerated and supplied to the decoder. Briefly, the decoder operates to form from each code group an amplitude modulated pulse corresponding to the sample voltage of the audio frequency signal represented by the incoming code group. A difficulty arises in that, until all the digits of an incoming code group have been received and supplied to the decoder, the decoder is not able to operate to form the desired amplitude modulated pulse. If, for example, the digits of the incoming code group are supplied to storage devices as they are received, the complete code group is only available in stored form for the interval between the receipt of the last digit of a code group and just prior to the receipt of the first digit of the next code group, when the storage arrangement will have to be reset.

To get over this difficulty the storage arrangement in the decoder to be described is such that the complete code group is available in stored form for a rather longer period.

In the description which follows it will be assumed that the receiver is operating in correct synchronism with the transmitter. It will further be assumed that all the sample voltages represented by the incoming code groups are of the same polarity, this being achieved, for example, by adding to each audio frequency signal at the transmitter a direct current component, a similar component being arranged to be subtracted from the reconstituted audio frequency signals at the receiver.

Referring now to FIGURE 1 of the drawings, the incoming code groups are supplied to a terminal 1 which is connected to one of the two inputs of each of seven input "AND" gates 2 to 8. The decoder also includes a digit pulse generator 9 which operates to generate seven trains of digit pulses, hereinafter referred to as the D2, D3, D4 . . . D8 pulses. The D2 pulses occur at intervals equal to the interval occupied by one channel group, in the time positions corresponding to the second digit of each incoming channel group, that is, in the time positions corresponding to the first digit of each incoming code group. The D3 to D8 pulses occur similarly in time positions corresponding to the second to seventh digits, respectively, of each incoming code group.

The D2 to D8 pulses are supplied to the second inputs of the input gates 2 to 8, respectively.

The outputs of the inputs gates 2 to 5 are connected to four storage stages 10 to 13, respectively. The storage stages 10 to 13 will hereinafter be referred to as the D2 to D5 storage stages 10 to 13, respectively.

The decoder also includes a first reset pulse generator 14, the output of which is connected to each of the D2 to D5 storage stages 10 to 13.

The outputs of the D2 to D5 storage stages 10 to 13 are connected to one of the two inputs of four "AND" gates 15 to 18, respectively. The gates 15 to 18 will hereinafter be referred to as the transfer gates 15 to 18.

The decoder also includes a transfer pulse generator 19, the output of which is connected to the other input of each of the transfer gates 15 to 18.

The decoder also includes a further group of seven storage stages 20 to 26, hereinafter referred to as the D2 to D8 storage stages 20 to 26, respectively. The outputs of the transfer gates 15 to 18 are connected to the inputs of the D2 to D5 storage stages 20 to 23, respectively, and the outputs of the input gates 6 to 8 are connected to the inputs of the D6 to D8 storage stages 24 to 26, respectively.

The decoder also includes a second reset pulse generator 27, the output of which is connected to each of the D2 to D8 storage stages 20 to 26.

Figure 2:
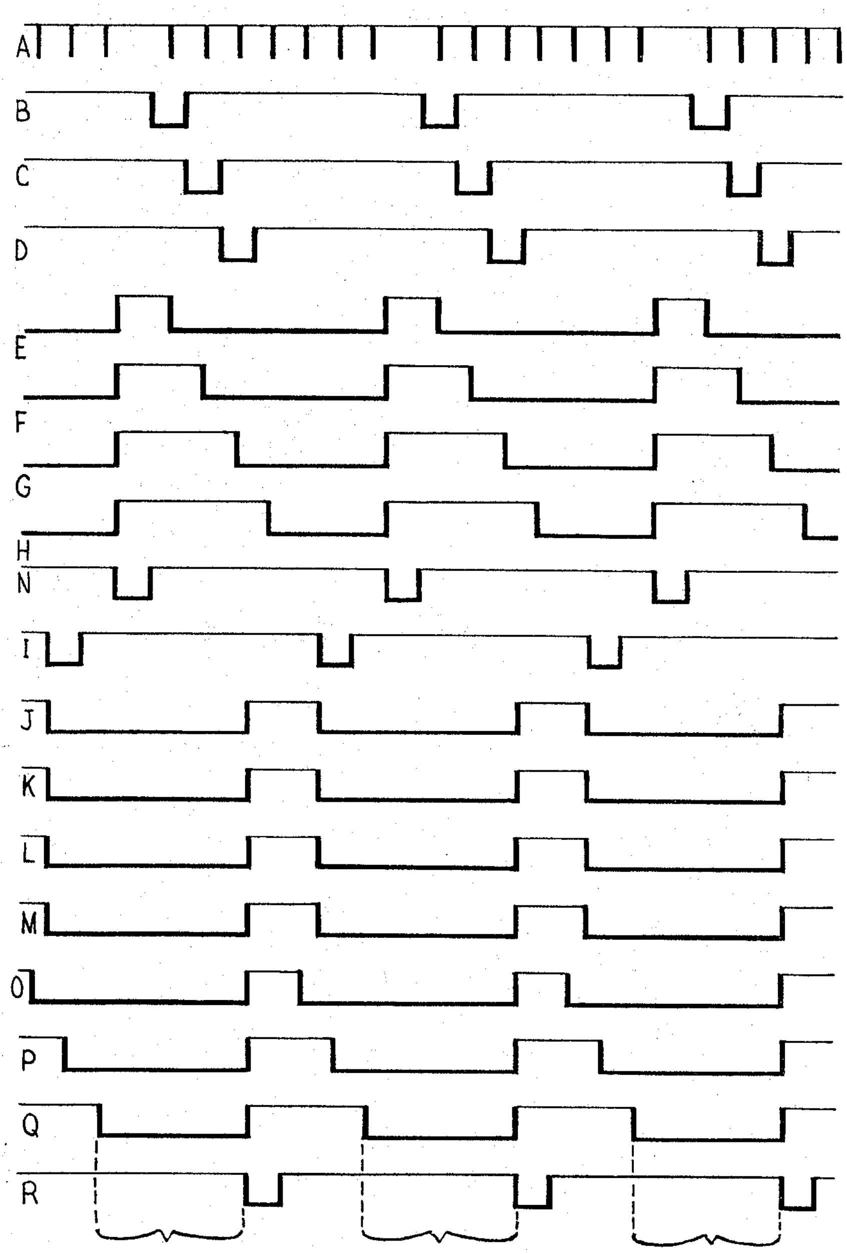
FIGURE 2 shows the waveforms of various signals referred to in connection with FIGURES 1, 3 and 4.

Before describing the decoder in further detail, the way in which the part of the decoder described operates will be outlined with reference also to FIGURE 2 of the drawings, which shows the waveforms of various signals appearing in the decoder during operation.

For the purpose of this explanation, it is convenient to assume that each incoming code group contains a pulse in each of the seven pulse positions as indicated by the waveform A of FIGURE 2. Waveforms B, C and D of FIGURE 2 represent the D2, D3 and D4 pulses, respectively, which are being supplied continuously by the digit pulse generator 9 to the input gates 2, 3 and 4, respectively. The D5 to D8 pulses are not illustrated by waveforms, but their form can readily be deduced from the waveforms B, C and D.

Considering the input gate 2, therefore, a pulse of the code group of waveform A will be supplied to one of the inputs of the input gate 2 at the same time that a D2 pulse of waveform B is supplied to the other input of the input gate 2.

The input gate 2 therefore supplies a pulse to the D2 storage stage 10, which thereupon stores an indication that a pulse was present in the appropriate pulse position in the code group of waveform A. The output signal supplied by the D2 storage stage 10 is therefore as represented by the waveform E of FIGURE 2.

In an exactly similar way, indications will be stored in the D3 to D5 storage stages 11 to 13 at times corresponding to the second, third and fourth pulses of the code group of waveform A. The output signals supplied by the D3 to D5 storage stages 11 to 13 will therefore be as represented by the waveforms F, G and H, respectively, of FIGURE 2.

After a D5 pulse, therefore, signals as represented by waveforms E, F, G and H will be being supplied to one input of each of the transfer gates 15 to 18, respectively. At this time the transfer pulse generator 19 will supply a pulse as represented by the waveform I of FIGURE 2 to the other input of each of the transfer gates 15 to 18, so that the signals represented by the waveforms E, F, G and H will then be supplied to the D2 to D5 storage stages 20 to 23, respectively.

In the case considered, therefore, each of the D2 to D5 storage stages 20 to 23 will be controlled to store an indication that a pulse was present in the appropriate pulse position in the incoming code group, and will supply an output signal as represented by the waveform J, K, L or M of FIGURE 2, respectively.

A short time after the transfer pulse of waveform I, the reset pulse generator 14 will supply a reset pulse, as represented by the waveform N of FIGURE 2 to the D2 to D5 storage stages 10 to 13, causing them all to be reset ready to receive indications in respect of the first four digits of the next incoming code group of waveform A.

Meanwhile, the input gates 6 to 8 will be controlled by the D6, D7 and D8 pulses, and in dependence upon the pulses in the fifth, sixth and seventh pulse positions of the incoming code group of waveform A, such that indications that pulses were present in these pulse positions are stored in the D6 to D8 storage stages 24 to 26, respectively. The D6 to D8 storage stages 24 to 26 will therefore then be supplying output signals as represented by the waveforms O, P and Q, respectively, of FIGURE 2.

Following a D8 pulse, therefore, the D2 to D8 storage stages 20 to 26 will be supplying output signals as represented by the waveforms J, K, L, M, O, P and Q, respectively, showing that pulses were present in all the pulse positions of the incoming code group of waveform A. These signals are all available simultaneously for the time interval indicated by the bracket at the foot of the waveforms of FIGURE 2, this time being equal to approximately one half of the time occupied by a channel group.

At the end of this interval, the reset pulse generator 27 supplies a reset pulse as represented by the waveform R of FIGURE 2 to each of the D2 to D8 storage stages 20 to 26, causing them all to be reset ready to receive indications in respect of the pulses in the pulse positions of the next incoming code group of waveform A.

It will be appreciated that the reset pulse of waveform R occurs at a time just prior to the next transfer pulse of waveform I, so that a short time after being reset the D2 to D5 storage stages 20 to 23 are required to store the indications in respect of the first four pulse positions in the next incoming code group of waveform A.

This completes the operations in respect of an incoming code group of waveform A, this sequence of operations then being repeated in respect of the next incoming code group.

Figure 3:
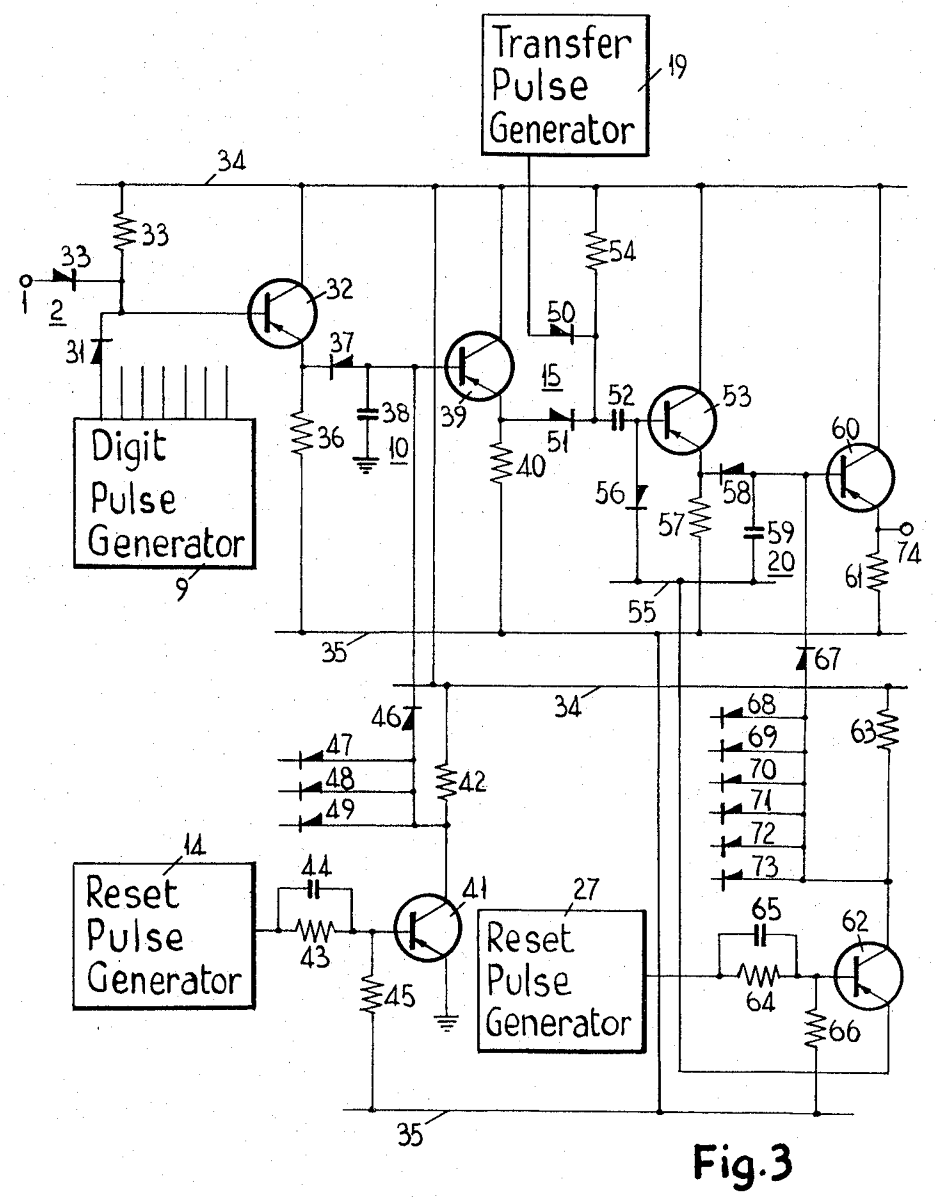
FIGURE 3 shows part of the decoder of FIGURE 1 in more detail.

Reference will now be made to FIGURE 3 of the drawings for a more detailed description of part of the decoder. The circuit shown in FIGURE 3 comprises the input gate 2, the digit pulse generator 9, the D2 storage stage 10, the reset pulse generator 14, the transfer gate 15, the transfer pulse generator 19, the D2 storage stage 20 and the reset pulse generator 27.

The input gate 2 comprises two rectifier elements 30 and 31, the cathode terminals of which are directly connected to the base electrode of a p-n-p junction transistor 32, and by way of a resistor 33 to a negative supply line 34 which is maintained at a potential of minus 10 volts relative to earth. The anode terminal of the rectifier element 30 is connected to the terminal 1 to which the incoming code groups are supplied, whilst the anode terminal of the rectifier element 31 is connected to the output of the digit pulse generator 9 over which the D2 pulses are supplied. The collector electrode of the transistor 32 is connected to the negative supply line 34. The emitter electrode of the transistor 32 is connected to a positive supply line 35 by way of a resistor 36. The positive supply line 35 is maintained at a potential of plus 10 volts relative to earth. The emitter electrode of the transistor 32 is also connected to the D2 storage stage 10 by way of a rectifier element 37 which has its cathode terminal adjacent the emitter electrode of the transistor 32.

The D2 storage stage 10 comprises a capacitor 38, one terminal of which is conected to earth, and the other terminal of which is connected to the anode terminal of the rectifier 37 and also to the base electrode of a p-n-p junction transistor 39. The collector electrode of the transistor 39 is connected to the negative supply line 34, and the emitter electrode of the transistor 39 is connected to the positive supply line 35 by way of a resistor 40.

Associated with the reset pulse generator 14 is a p-n-p junction transistor 41, the collector electrode of which is connected to the negative supply line 34 by way of a resistor 42, and the emitter electrode of which is earthed. Pulses supplied by the reset pulse generator 14 are supplied to the base electrode of the transistor 41 by way of a resistor 43 and a capacitor 44 in parallel. The base electrode of the transistor 41 is also connected to the positive supply line 35 by way of a resistor 45. The collector electrode of the transistor 41 is connected by way of a rectifier element 46 to the terminal of the capacitor 38 adjacent the base electrode of the transistor 39. The rectifier element 46 has its anode terminal nearer the collector electrode of the transistor 41.

The collector electrode of the transistor 41 is similarly connected, by way of rectifier elements 47, 48 and 49, respectively, to the capacitors corresponding to the capacitor 38 in the D3 to D5 storage stages 11 to 13 (FIGURE 1).

The transfer gate 15 comprises two rectifier elements 50 and 51, the cathode terminals of which are connected by way of a capacitor 52 to the base electrode of a p-n-p junction transistor 53. The anode terminal of the rectifier element 50 is connected to the transfer pulse generator 19, and the anode terminal of the rectifier element 51 is connected to the emitter electrode of the transistor 39. The cathode terminals of the rectifier elements 50 and 51 are also connected by way of a resistor 54 to the negative supply line 34. This arrangement provides alternating current coupling between the emitter electrode of the transistor 39 and the base electrode of the transistor 53.

The terminal of the capacitor 52 nearer the base electrode of the transistor 53 is connected to a positive supply line 55 by way of a rectifier element 56 which has its cathode terminal nearer the positive supply line 55. The positive supply line 55 is maintained at a potential of plus 6 volts relative to earth.

The collector electrode of the transistor 53 is connected to the negative supply line 34, and the emitter electrode of the transistor 53 is connected to the positive supply line 35 by way of a resistor 57. The emitter electrode of the transistor 53 is also connected to the D2 storage stage 20 by way of a rectifier element 58, which has its cathode terminal nearer the emitter electrode of the transistor 53.

The D2 storage stage 20 comprises a capacitor 59 one terminal of which is connected to the positive supply line 55, and the other terminal of which is connected to the anode terminal of the rectifier element 58 and to the base electrode of a p-n-p junction transistor 60. The collector electrode of the transistor 60 is connected to the negative supply line 34, and the emitter electrode of the transistor 60 is connected to the positive supply line 35 by way of a resistor 61.

Associated with the reset pulse generator 27 is a p-n-p junction transistor 62, the collector electrode of which is connected to the negative supply line 34 by way of a resistor 63, and the emitter electrode of which is connected to the positive supply line 55. Pulses supplied by the reset pulse generator 27 are supplied to the base electrode of the transistor 62 by way of a resistor 64 and a capacitor 65 in parallel. The base electrode of the transistor 62 is also connected to the positive supply line 35 by way of a resistor 66. The collector electrode of the transistor 62 is connected by way of a rectifier element 67 to the terminal of the capacitor 59 adjacent the base electrode of the transistor 60. The rectifier element 67 has its anode terminal nearer the collector electrode of the transistor 62.

The collector electrode of the transistor 62 is similarly connected, by way of rectifier elements 68 to 73, respectively, to the capacitors corresponding to the capacitor 59 in the D3 to D8 storage stages 21 to 26 (FIGURE 1).

The emitter electrode of the transistor 60 is connected to a terminal 74, the signal represented by waveform J of FIGURE 2 being developed at the terminal 74 during operation.

Figure 4:
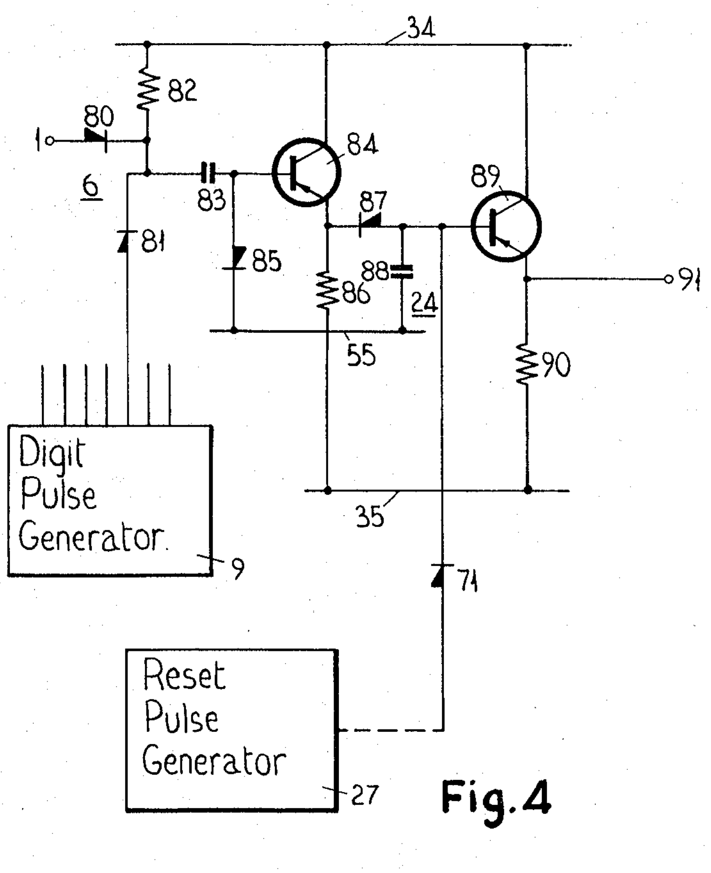
FIGURE 4 shows another part of the decoder of FIGURE 1 in more detail.

Reference will now be made to FIGURE 4 of the drawings for a more detailed description of another part of the decoder. The circuit shown in FIGURE 4 comprises the input gate 6, the digit pulse generator 9 and the D6 storage stage 24, and the reset pulse generator 27.

The input gate 6 comprises two rectifier elements 80 and 81, the cathode terminals of which are connected by way of a resistor 82 to the negative supply line 34 and by way of a capacitor 83 to the base electrode of a p-n-p junction transistor 84. The anode terminal of the rectifier element 80 is connected to the terminal 1 to which the incoming code groups are supplied, whilst the anode terminal of the rectifier element 81 is connected to the output of the digit pulse generator 9 over which the D6 pulses are supplied. The base electrode of the transistor 84 is also connected to the positive supply line 55 by way of a rectifier element 85, which has its anode terminal nearer the base electrode. The collector electrode of the transistor 84 is connected to the negative supply line 34, and the emitter electrode of the transistor 84 is connected to the positive supply line 35 by way of a resistor 86.

The emitter electrode of the transistor 84 is also connected to the D6 storage stage 24 by way of a rectifier element 87 which has its cathode terminal nearer the emitter electrode of the transistor 84.

The D6 storage stage 24 comprises a capacitor 88, one terminal of which is connected to the positive supply line 55, and the other terminal of which is connected to the anode terminal of the rectifier element 87 and to the base electrode of a p-n-p junction transistor 89. The collector electrode of the transistor 89 is connected to the negative supply line 34 and the emitter electrode of the transistor 89 is connected to the positive supply line 35 by way of a resistor 90.

The rectifier element 71, associated with the reset pulse generator 27 and referred to in connection with FIGURE 3, has its cathode terminal connected to the base electrode of the transistor 89.

The emitter electrode of the transistor 89 is connected to a terminal 91, the signal represented by the waveform O being developed at the terminal 91 during operation.

A fuller description of the operation of the part of the decoder described will now be given with reference to FIGURES 2, 3 and 4 of the drawings. As before, it will be assumed that each incoming code group contains a pulse in each of the seven pulse positions as indicated by the waveform A.

Considering the input gate 2 of FIGURE 3, therefore, a pulse of the code group of waveform A will be supplied to the terminal 1 at the same time that a D2 pulse of waveform B is supplied to the input gate 2 by the digit pulse generator 9. Each of these pulses is negative-going and has an amplitude of 10 volts. These pulses, applied simultaneously to the rectifier elements 30 and 31 respectively cause the capacitor 38 to be charged to a potential of approximately minus 10 volts. In other words, the D2 storage stage 10 is then storing an indication that a pulse was present in the appropriate pulse position of the incoming code group. Had a pulse not been present in this pulse position, the capacitor 38 would not have been charged, and this would have indicated that no pulse was present in the appropriate pulse position of the incoming code group.

The signal supplied by the D2 storage stage to the base electrode of the transistor 39 will therefore be as represented by the waveform E.

In a similar way, the D3 to D5 storage stages 11 to 13 of FIGURE 1 will supply signals as represented by the waveforms F, G and H, respectively.

After a D5 pulse, therefore, a signal as represented by the waveform E will be supplied to the transfer gate 15, that is, to the rectifier element 51. At this time the transfer pulse generator 19 will supply a pulse as represented by the waveform I to the rectifier element 50, so that the potential at the base electrode of the transistor 53 changes from approximately plus 6 volts to approximately minus 4 volts. This causes the capacitor 59 to be charged, so that the D2 storage stage 20 is then storing an indication that a pulse was present in the appropriate pulse position of the incoming code group. Whilst the capacitor 59 is charged the terminal 74 is held at a potential of approximately minus 4 volts, as against approximately plus 6 volts when the capacitor 59 is discharged. The waveform of the signal developed at the terminal 74 is therefore as indicated by the waveform J.

A short time after the transfer pulse of waveform I, the reset pulse generator 14 will supply a reset pulse to the base electrode of the transistor 41, causing the transistor 41 to conduct. This means that the capacitor 38 then has earth potential applied to both its terminals, and the capacitor 38 is therefore discharged.

Meanwhile, the input gate 6 of FIGURE 4 and the D6 storage stage 24 will be controlled in a very similar manner, but in dependence upon the pulse in the fifth pulse position of the incoming code group, such that the signal developed at the terminal 91 is as indicated by the waveform O.

Referring again to FIGURE 1, it will therefore be seen that the D2 to D8 storage stages 20 to 26 will then all be supplying output signals as represented by the waveforms J, K, L, M, O, P and Q, respectively, and, as previously indicated, these signals will all be present for the time interval indicated by the bracket at the foot of the waveforms of FIGURE 2.

Referring again to FIGURES 3 and 4, at the end of this interval, the reset pulse generator 27 supplies a reset pulse to the base electrode of the transistor 62 causing it to conduct. The capacitors 59 and 88 therefore each have a potential of plus 6 volts applied to each of their terminals, so restoring the capacitors 59 and 88 to their original condition.

The remaining parts of the decoder and of the receiver generally may be of known form, and will not therefore be described in detail.

Briefly, however, the remaining parts are as follows. Seven parallel-connected paths are provided connected between an earth line and an intermediate line, and the intermediate line is connected to a supply line, which is maintained at a substantially stable potential relative to earth, by way of a resistor. Each of the parallel-connected paths comprises the collector-emitter path of a p-n-p junction transistor and a resistor in series. The values of the resistors in the parallel-connected paths are graded, so that if the value of the resistor in the first path is $r$, the value of the resistor in the second path is $2r$, the value of the resistor in the third path is $4r$, and so on, until the value of the resistor in the seventh path is $64r$. Output terminals are connected to the earth line and the intermediate line.

During operation, the signals represented by the waveforms J, K, L, M, O, P and Q are supplied to the base electrodes of the transistors in the first to seventh parallel-connected paths, respectively. In each case where there is a pulse in a pulse position of the incoming code group, the transistor in the corresponding parallel-connected path will be caused to conduct, so that the resultant potential difference between the output terminals will be dependent upon the digits of the code group and will, in fact, be proportional to the sample voltage represented by that code group. This resultant potential difference between the output terminals will be present for the time interval indicated by the bracket at the foot of the waveforms of FIGURE 2, and at some time during this interval this potential difference is sampled to provide a reconstituted sample voltage.

This reconstituted sample voltage is then passed to equipment which is individual to the channel to which this reconstituted sample voltage relates. Each such equipment includes a pulse lengthening network and a low-pass filter, which together operate to provide from a sequence of reconstituted sample voltages a reconstituted audio frequency signal which is a reasonably faithful reproduction of the audio frequency signal being transmitted over that particular channel.

As a modification to the decoder, the part shown in FIGURES 1 and 3 can be simplified by the omission of the transfer gates 15 to 18 and the transfer pulse generator 19. In this case each of the storage stages 10 to 13 is modified so that the transfers from the storage stages 10 to 13 to the storage stages 20 to 23, respectively, occur when the storage stages 10 to 13 are reset, this resetting being done at a time appropriate for the transfer.

Figure 5:
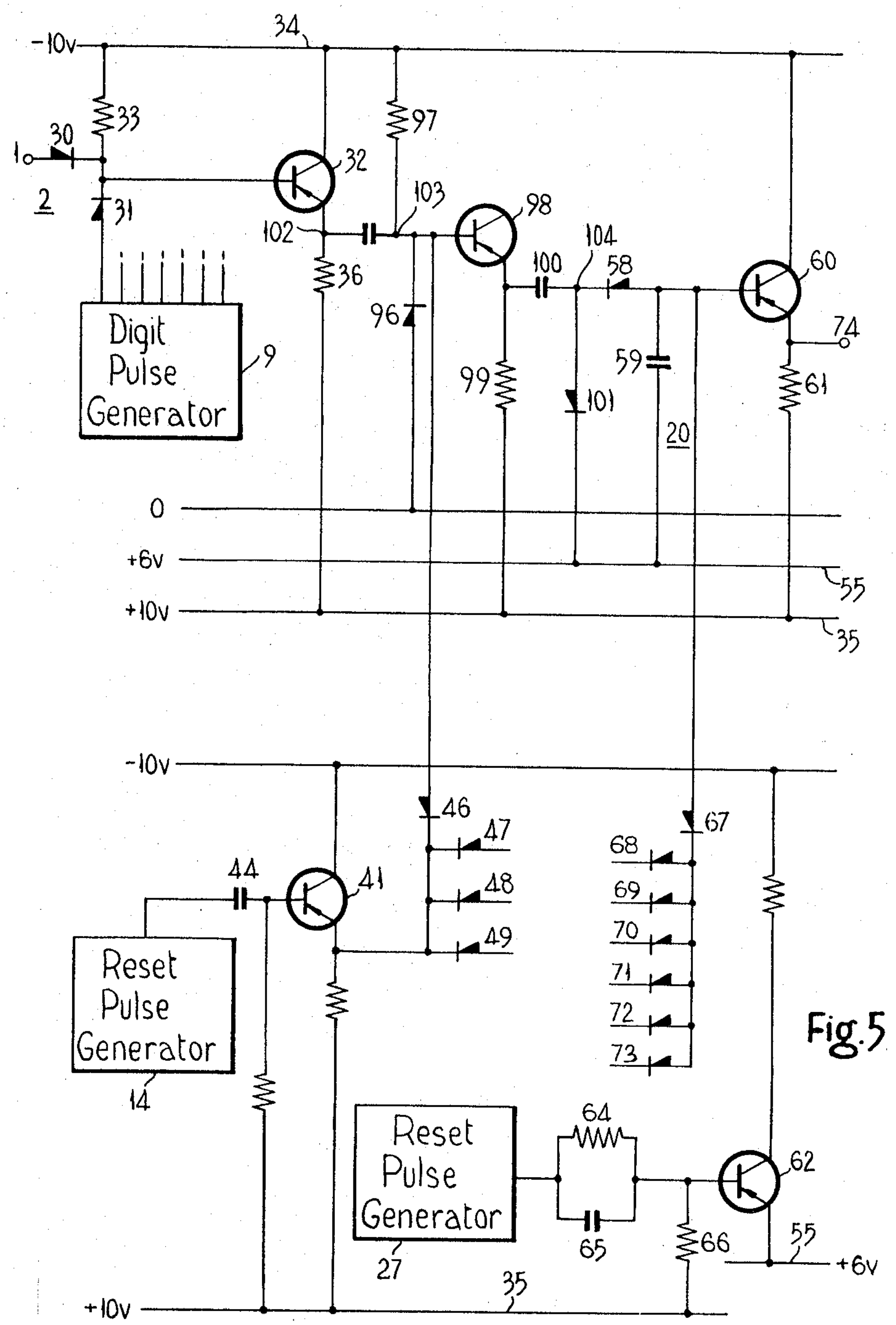
FIGURE 5 shows a modification of that part of the decoder shown in FIGURE 3.

The circuit of this modification is shown in FIGURE 5 in which components having the same function as in FIGURE 3 are similarly referenced.

Referring to FIGURE 5, a digit 2 pulse of a code group will be supplied to terminal 1 at the same time as the corresponding D2 pulse from the digit pulse generator 9 is supplied to rectifier 31 of input gate 2. A gated negative going pulse will thus be supplied to the base of the emitter follower transistor 32 and the point 102, i.e. the junction of resistor 36, capacitor 95 and emitter of transistor 32, will tend to follow the change of base potential. The point 103 i.e. the other electrode of capacitor 95 is tied in potential to the earth or zero line by the rectifier element 96 and therefore the negative going pulse will tend to charge the capacitor 95. The trailing or positive-going edge of this gated pulse will cause point 103 to move positively, rectifier element 96 being then reverse biased and ineffective to maintain the point 103 potential at zero. Capacitor 95 will then discharge partially through resistor 97 until a D8 pulse is supplied by the reset pulse generator to the capacitor 44 and transistor 41. This negative going reset pulse forward biases rectifier element 46 in the reset path and immediately lowers the potential of point 103 to zero again.

The negative-going return to zero of point 103 causes a corresponding negative movement of point 104 which is tied to the plus 6 volt line 55 by a rectifier element 101. As element 101 is reverse biased at this stage it is therefore unable to limit the negative potential movement of point 104. Capacitor 100 then charges up very slowly through the reverse resistance of rectifier element 101 thus tending to return point 104 to its plus 6 volt potential level. This process continues until the next digit 2 pulse in the following code group, if there should be one present, or if not, until the next D5 pulse from reset pulse generator 27.

Capacitor 59 of storage stage 20 has one electrode connected to the plus 6 volt line 55 and the other to the rectifier element 58 and base of emitter follower transistor 60. The negative-going movement of the leading edge of the pulse occurring at point 104 causes the forward biasing of rectifier element 58 and charging up of capacitor 59 through element 58. As element 58 is reverse-biased when point 104 returns to plus 6 volts capacitor 59 holds its charge until the next D5 pulse from reset pulse generator 27. This waveform applied to the base of transistor 60 produces an output pulse at terminal 74 consisting of a negative going pulse extending from the beginning of the D8 pulse of the code group containing the digit 2 pulse, to the beginning of the D5 pulse of the next code group.

Similar pulses occur at the D3, D4 and D5 output terminals, each, when present, extending from the D8 pulse of the code group under consideration to just prior to the D5 pulse of the following code group. The output pulses for the remaining digits D6, D7 and D8 are obtained as previously with reference to FIGURE 4.

We claim:

1. A decoder for a receiver of a pulse code modulation system of the kind in which successive amplitude samples of a signal to be transmitted over the system are represented in serial pulse form by respective groups of digits, each group consisting of a number, *a* plus *b*, of digits (*a* and *b* each being integral numbers), said decoder comprising a first group of *a* storage stages, a second group of *a* plus *b* storage stages, gating means to supply the first *a* digits of each incoming group of *a* plus *b* digits to said first group of *a* storage stages respectively and to supply the last *b* digits of each said incoming group to a last *b* storage stages respectively of said second group, transfer means connected between said first group of storage stages and a first *a* storage stages of said second group of storage stages to initiate the storage of digits in said first *a* storage stages of said second group corresponding respectively to the digits stored in said first group of storage stages, means to reset said first group of storage stages for the reception of the first *a* digits of the next incoming group of *a* plus *b* digits, the storage times in each storage stage being such that *a* plus *b* digits for each incoming group are stored simultaneously in said second group of storage stages for an interval exceeding one digit period of the incoming groups of digits, and resetting means for resetting said second group of storage stages at the end of said interval.

2. A decoder according to claim 1, wherein said transfer and resetting means are so adapted that said interval extends from the last of the last *b* digits until just prior to the last of the first *a* digits in the next incoming group of digits.

3. A decoder according to claim 1 wherein said transfer means are so connected between said first group of storage stages and the first *a* storage stages of said second group that the initiation of storage of digits in the first *a* storage stages of said second group is effected simultaneously.

4. A decoder according to claim 1 wherein said transfer means comprises *a* capacitors, *a* AND-gates and a pulse generator, one electrode of each of said capacitors being connected to a respective one of said second group of storage stages, the other electrode of each of said capacitors being connected to the outputs of respective ones of said AND-gates each of which has two inputs, one input being connected to a respective one of said first group of storage stages and the other input being connected to a pulse generator adapted to supply gating pulses to each said AND-gate once during each period of an incoming group of digits to initiate the storage of a digit in each of said first *a* storage stages of said second group.

5. A decoder according to claim 1, wherein a respective emitter-follower transistor stage is connected to the output of each of said storage stages, the signal output from each storage stage being derived from the output of the respective transistor stage.

6. A decoder according to claim 1, wherein said gating means comprises *a* plus *b* AND-gates and a digit pulse generator which provides a pulse to one input of each of said *a* plus *b* AND-gates in sequence, the other input of each AND-gate being connected to receive the incoming signal.

7. A decoder according to claim 1, wherein said means to reset said first group of storage stages comprises a pulse generator connected by respective rectifier means to each of said first group of storage stages.

8. A decoder according to claim 1, wherein said transfer means constitute said means to reset said first group of storage stages.

9. A decoder according to claim 1, wherein *a* is equal to four and *b* is equal to three.

10. A decoder according to claim 1, wherein the storage element of each of said storage stages comprises a capacitor.

11. A decoder for a receiver of a pulse code modulation system of the kind in which successive amplitude samples of a signal to be transmitted over the system are represented in serial pulse form by respective groups of digits, each group consisting of a number, *a* plus *b*, of digits (*a* and *b* each being integral numbers), said decoder comprising a first group of *a* storage stages, a second group of *a* plus *b* storage stages, first gating means to supply the first *a* digits of each incoming group of *a* plus *b* digits to said first group of *a* storage stages respectively, transfer means connected between said first group of storage stages and the first *a* storage stage of said second group, means to control said transfer means to cause digits stored by the first group of storage means respectively to be transferred simultaneously to *a* stages of said second group subsequent to the first *a* digits of an incoming group being stored by the first group, second gating means to supply the last *b* digits of each incoming group respectively to the other *b* stages of said second group, and means operative subsequent to the last *b* digits of an incoming group being stored by the second group to supply in parallel *a* plus *b* electric signals that are respectively characteristic of the *a* plus *b* digits in each incoming group.

References Cited by the Examiner

UNITED STATES PATENTS 3,084,222 4/1963 Foot et al. ---------- 179—15

ROBERT L. GRIFFIN, *Primary Examiner.*